UNITED STATES PATENT OFFICE 2,529,055

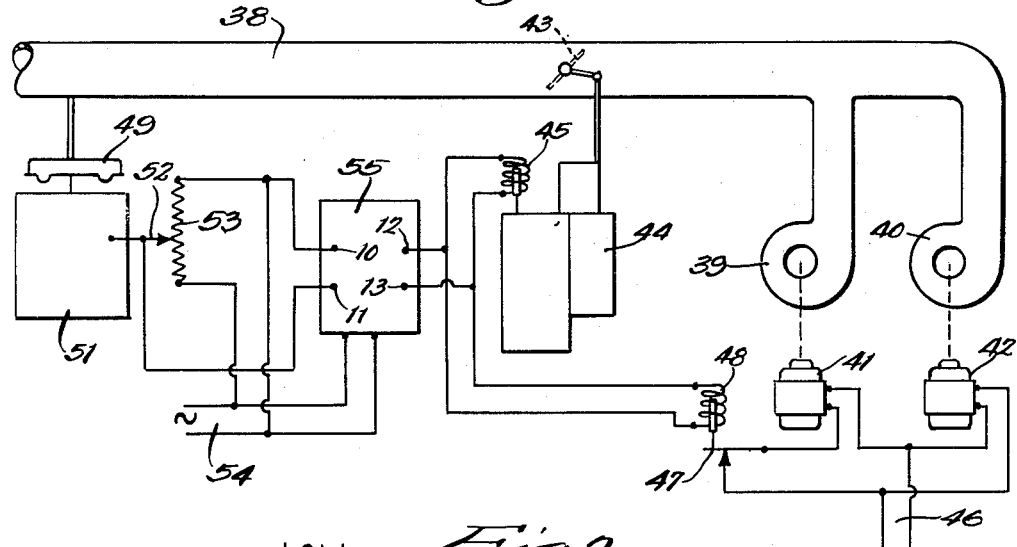
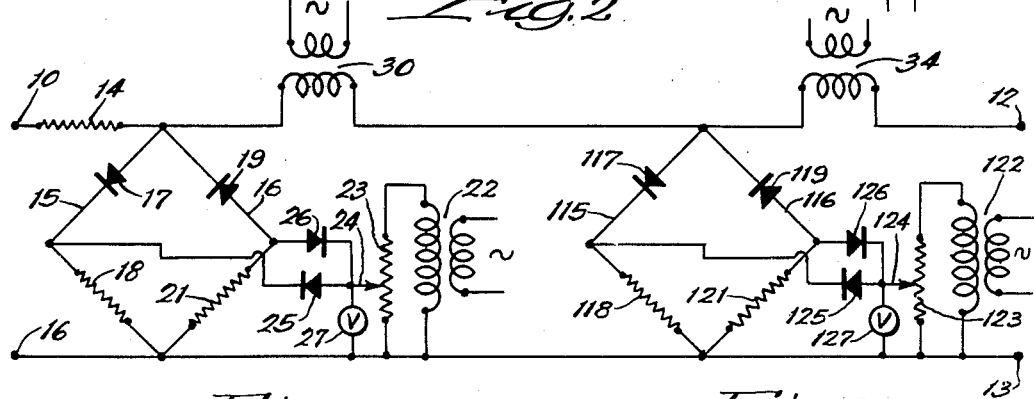
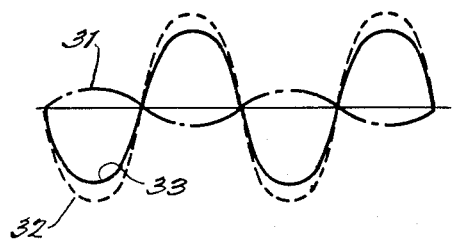
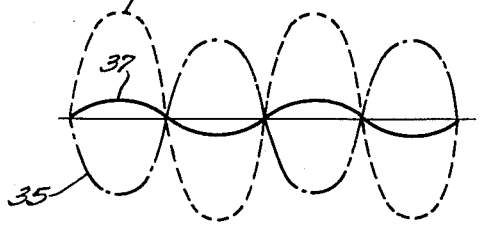

VOLTAGE LIMITING MEANS

Charles H. Smoot, Chicago, Ill., assignor to Republic Flow Meters Company, Chicago, Ill., a corporation of Illinois Application November 9, 1948, Serial No. 59,061

12 Claims. (Cl. 171—97)

This invention relates to voltage limiting means and more particularly to means for limiting either the maximum voltage, the minimum voltage, or both in a circuit.

It is desirable under many circumstances to limit either the maximum or the minimum voltage or both which is supplied to electrical units in either A. C. or D. C. apparatus. In A. C. circuits it is also highly desirable to limit the voltage without distorting the wave form as occurs when ordinary clipping devices are employed. It is accordingly a principal object of the present invention to provide voltage limiting means which can limit either the maximum or the minimum voltage or both and which will not distort the wave form of an alternating current voltage.

Another object is to provide voltage limiting means in which similar limiting devices can be utilized to limit both maximum and minimum voltage. To limit minimum voltage according to the invention, an external voltage is supplied to the circuit which is opposite in phase or polarity to the voltage to be limited and which is of greater amplitude so that the polarity or phase of the controlled voltage will be reversed. The maximum amplitude of the reversed voltage is then limited, and subsequent to the limiting a second external voltage of the same amplitude as and of opposite phase or polarity to the first external voltage is added.

The above and other objects and advantages of the invention will be more readily apparent when read in connection with the accompanying drawing, in which—

Figure 1 is a diagrammatic view of one type of apparatus in which a voltage limiting means according to the invention is employed;

Figure 2 is a circuit diagram of the voltage limiting means; and

Figures 3 and 4 are diagrams illustrating the effect of the apparatus at different points in the circuit.

Referring first to Figure 2, the voltage to be limited is supplied at terminals 10 and 11 to the voltage limiting circuit, and the output from the circuit is from terminals 12 and 13. Adjacent the terminal 10 there is illustrated a resistor 14 offering a relatively high impedance in the circuit. It will be understood that when a high impedance source is employed the resistor 14 may represent the source impedance, but when a low impedance source is employed, a separate resistor, as shown, may be required.

Immediately after the resistor 14 and across the circuit there is connected a maximum voltage limiting device which, as shown in Figure 2, is adapted to limit the peak voltage in an alternating current wave without producing distortion of the wave form. This device comprises a pair of parallel circuits indicated at 15 and 16 connected across the voltage limiting circuit. The circuit 15 includes a rectifier 17 in series with a resistor 18 whose value is low relative to the resistor 14 with the rectifier 17 arranged to pass current downwardly from the line 10—12 to the line 11—13. The circuit 16 includes a rectifier 19 in series with a resistor 21 with the rectifier 19 arranged so that its polarity is opposite to that of the rectifier 15 to pass current from the line 11—13 to the line 10—12.

An alternating current source illustrated as a transformer 22 is supplied with alternating voltage from any convenient source of the same frequency and in phase with the signal source applied to the terminals 10 and 11. The secondary of the transformer is connected at one side to the line 11—13 and has its other side also connected to this line through a potentiometer resistance 23. An adjustable wiper 24 engages the resistance 23 and is connected through a rectifier 25 to a point in the circuit 15 between the rectifier 17 and the resistor 18. As shown, the rectifier 25 is arranged opposite to the rectifier 17 in the circuit to pass current from the wiper to the circuit 15. The wiper is also connected through a rectifier 26 to a point in the circuit 16 between the rectifier 19 and the resistor 21. The rectifier 26 is arranged so that its polarity is opposite to that of the rectifier 19 in the circuit to pass current from the circuit 16 toward the wiper. Preferably, a voltmeter, as shown at 27, is connected from the wiper to the line 11—13 to indicate the voltage for which the wiper is adjusted.

In operation assume that a voltage is impressed across the terminals 10 and 11 whose polarity is such that the terminal 10 is positive relative to the terminal 11. A similar voltage in phase with the impressed voltage is supplied to the transformer 22, and the wiper 24 is adjusted to the maximum value of the impressed voltage desired. For example, the wiper 24 may be so adjusted that the voltage thereon is forty (40) volts positive relative to the line 11—13. As long as the voltage on the terminal 10 is less than forty (40) volts, there will be no flow through either of the circuits 15 or 16, the rectifier 19 blocking flow through the circuit 16 and the forty (40) volt potential impressed on the mid point of the circuit 15 through the rectifier 25 preventing any flow through the rectifier 17. If, however, the potential on the terminal 10 should exceed that on the wiper 24, current will flow from the line 10—12 through the rectifier 17 and resistor 18 to the line 11—13 to drop the potential across the two lines to that for which the wiper 24 is adjusted. Thus the peak voltage during the half cycles when the terminal 10 is positive can never exceed that for which the wiper 24 is adjusted. Since the voltage on the terminal and the wiper are both sine wave voltages, it will be noted that the value at all positions on the wave is fixed by the instantaneous potential of the wiper 24 so that the voltage is limited according to a sine wave and is not distorted.

When the polarity is reversed so that terminal 11 is positive relative to terminal 10, the wiper 24 becomes negative relative to the terminal 11. As long as the wiper 24 is more negative than terminal 10 relative to terminal 11, there will be no flow through the rectifier 19, but a flow will be established around the local circuit including the wiper 24, the resistor 21, and the rectifier 26 to maintain the potential at the mid point of the circuit 16 equal to that of the wiper 24. If the potential across the terminals 10 and 11 should exceed that between terminal 11 and wiper 24, current will flow from the terminal 11 through the circuit 16 to the line 10—12 to reduce the potential difference to that established by adjustment of the wiper 24. In this case also reduction of the potential will follow the wave form of the potential on the wiper 24 so that the wave will be undistorted. The voltmeter 27 serves to indicate adjustment of the wiper.

To limit the minimum voltage in the circuit, a second maximum voltage limiting device is connected across the circuit spaced from the first described device. As shown in Figure 2, the second maximum voltage limiting device is identical with the first maximum voltage limiting device and parts thereof are indicated by the same reference numerals plus 100. Between the two maximum voltage limiting devices a voltage is supplied to the circuit which is greater in amplitude than the maximum for which the first limiting device is set and which is 180° out of phase with the input voltage. As shown, this voltage is supplied by a transformer 30 whose secondary is connected in series in the line 10—12 and whose primary is supplied from alternating current sources equal in frequency and in phase with the supply source. The transformer is so wound and connected that the secondary voltage is out of phase with the impressed voltage and is in excess of the value for which the first limiting device is set. For example, if the first limiting device is set for forty (40) volts, the transformer 30 may impress forty-five (45) volts on the circuit.

The effect of the transformer 30 is illustrated diagrammatically in Figure 3 wherein the dot-dash line 31 represents the output voltage from the first limiting device and the dotted line 32 indicates the voltage wave of the transformer secondary. These two voltages will be added algebraically to produce an output voltage wave indicated by the solid line 33 which is of opposite phase to the wave 31 and whose amplitude is equal to the algebraic sum of the waves 31 and 32. It will be noted that as the wave 31 becomes smaller in amplitude, the wave 33 increases in amplitude.

The wave 33 is impressed across the second voltage limiting device which functions in exactly the same manner as the first voltage limiting device to limit maximum voltage of the wave 33. If the wave 33 should tend to exceed the value for which the second voltage limiting device is set, its amplitude will be reduced without producing distortion of its wave form. Thus the output wave from the second voltage limiting device which is inverted in phase with respect to the impressed wave can never exceed a predetermined amplitude.

Following the second voltage limiting device a second transformer 34 is connected in the line 10—12 to supply thereto a voltage wave equal in amplitude to the voltage supplied by the transformer 30 but again inverted in phase so that it is in phase with the initially impressed wave. The effect of this transformer is illustrated in Figure 4 wherein the dot-dash line 35 indicates the voltage wave at the output side of the second limiting device and the dotted line 36 indicates the voltage wave produced by the transformer 34. It will be noted that these two voltages are 180° out of phase so that they will be added algebraically to produce the resultant output wave 37. It will be seen that this wave is equal in phase and amplitude to the wave 31 as seen in Figures 3 and 4.

When the output wave from the first limiting device, as shown at 31, is in excess of the desired minimum value, the conditions, as illustrated in Figures 3 and 4, will exist. However, if the wave 31 should be below the desired minimum, it will be seen that when it is inverted and added to the wave 32 to produce the wave 33 the amplitude of the wave 33 will be greater than the maximum value for which the second voltage limiting device is set. Under these conditions the second voltage limiting device will limit the voltage of the wave 33 so that when it is added algebraically to the voltage 36 the resultant output voltage 37 will at all times equal or exceed a predetermined minimum value. It will further be noted that this is accomplished without distorting the wave form.

While the voltage limiting device as described may find many uses either for limiting maximum voltage or minimum voltage or both, there is illustrated in Figure 1 a control system in which the device is desirable. The system, as shown, is adapted to maintain a predetermined fluid pressure in a conduit 38 supplied with fluid by a pair of blowers 39 and 40 driven respectively by motors 41 and 42. Flow through the conduit is controlled by a butterfly valve 43 operated by a regulator 44 which may be of the type more particularly described and claimed in the patent to Rosenberger, No. 2,220,176. Such a regulator, as described in the Rosenberger patent, will function to produce a valve position proportional to a loading pressure which in the construction illustrated is supplied by a solenoid 45 so that the valve position will be proportional to the current flow through the solenoid 45.

In the construction shown the motor 42 is connected directly to a source 46 so that it will run constantly during operation, and the motor 41 is connected to the source through a switch 47 controlled by a solenoid 48. When the current in the solenoid 48 is less than a predetermined value, the switch 47 will be closed, but when the current exceeds the predetermined value, the switch 47 will open to stop the motor 41 and the blower 39.

Pressure in the pipe 38 is sensed by a diaphragm 49 controlling a regulator 51 which may be of the type more particularly described and claimed in the patent to Rosenberger, No. 2,220,176. This regulator moves a wiper 52 over a potentiometer resistance 53 to a position variable with the pressure in the pipe 38. The resistor 53 is supplied from a source 54 of alternating current which may also supply the voltage limiting circuit indicated generally at 55. The terminals 10 and 11 of the voltage limiting circuit are connected across the wiper 52 and one side of the resistor 53 to receive a variable input voltage which is adjustable in accordance with the pressure in the pipe 38. The output terminals 12 and 13 of the voltage limiting circuit are connected to the coils 45 and 48, as shown.

The regulator 44 is so adjusted that when the current supplied to the coil 45 is relatively low the valve 43 will be open and as the current increases the valve will move toward its closed position. As the valve 43 is moved to a more nearly closed position to restrict flow through the conduit 38 thereby to reduce the pressure at the downstream side of the valve, the motor 41 will be cut out so that all of the fluid will be supplied by the single blower 40. On the other hand, as the valve starts to open, the motor 41 will be energized so that fluid will be supplied by both of the blowers.

As the pressure changes in the pipe 38, the regulator 51 will adjust the wiper 52 to change the voltage supply to the coils 45 and 48 which are preferably so wound as to have a high impedance. If the voltage tends to exceed a desired maximum value, it will be limited by the first voltage limiting device, as described above in connection with Figure 2, so that the maximum voltage applied to the coils can never exceed a predetermined value at which the valve 43 will be closed to its maximum closed position and the switch 47 will be open. Similarly, the second voltage limiting device will prevent the voltage from ever falling below a predetermined minimum value which it is desired to maintain on the coils and particularly on the coil 45 to insure proper operation of the regulator 44. It will be apparent that many other uses for the voltage limiting means of the invention can be found and that the system illustrated in Figure 1 is for example only.

While one embodiment of the invention has been shown and described in detail herein, it will be understood that this is illustrative only and is not to be taken as a definition of the scope of the invention, reference being had for this purpose to the appended claims.

What is claimed is:

1. A voltage limiting device for an alternating current circuit including two lines, comprising a pair of parallel circuits connected across the lines with a rectifier and an impedance in series in each circuit and with the polarities of the rectifiers in the circuits opposite, an alternating current source of the same frequency as the voltage to be limited, and means connecting said source to points in the circuits between the rectifiers and impedances in a phase relationship such as to oppose flow of current between the lines through the circuits.

2. A voltage limiting device for an alternating current circuit including two lines, comprising a pair of parallel circuits connected across the lines with a rectifier and an impedance in series in each circuit and with the polarities of the rectifiers in the circuits opposite, an alternating current source of the same frequency as the voltage to be limited, and connections from the source across the impedances in a phase relationship such as to oppose flow of current between the lines through the circuits.

3. A voltage limiting device for an alternating current circuit including two lines, comprising a pair of parallel circuits connected across the lines with a rectifier and an impedance in series in each circuit and with the polarities of the rectifiers in the circuits opposite, an alternating current source of the same frequency as the voltage to be limited, separate connections from the source to points in the circuits between the rectifiers and impedances, and rectifiers in the connections of opposite polarity to the rectifiers in the circuits.

4. A voltage limiting device for an alternating current circuit including two lines, comprising a pair of parallel circuits connected across the lines with a rectifier and an impedance in series in each circuit and with the polarities of the rectifiers in the circuits opposite, an alternating current source of the same frequency as the voltage to be limited, connections from the source across the impedances, and rectifiers in the connections of opposite polarity to the rectifiers in the respective circuits.

5. A voltage limiting device for an alternating current circuit including two lines comprising a pair of parallel circuits connected across the lines with a rectifier and an impedance in series in each circuit and with the polarities of the rectifiers in the circuits opposite, an alternating current source of the same frequency as the voltage to be limited, a connection from one side of the source to the line to which the impedances are connected, a resistor connected from the other side of the source to said line, a wiper engaging the last named resistor, separate connections from the wiper to points in the circuits between the rectifiers and resistors, and rectifiers in the last named connections of opposite polarity to the rectifiers in the respective circuits.

6. A minimum voltage limiting circuit comprising a device for limiting maximum voltage connected across the circuit, a source to impress on the circuit at the input side of the device a predetermined voltage of opposite polarity than and larger than the maximum value of the voltage to be limited, and a second source to impress on the circuit at the output side of the device a voltage equal to said predetermined voltage and of the same polarity as the voltage to be limited.

7. A minimum voltage limiting means for an alternating current circuit comprising a device connected across the circuit to limit the maximum voltage thereacross, an alternating current source of opposite phase and of greater amplitude than the voltage to be limited connected in one side of the circuit at the input side of the device, and a second alternating current source of the same phase as the voltage to be limited and of the same amplitude as the first named source connected in said one side of the circuit at the output side of the device.

8. Voltage limiting means for a circuit comprising a pair of maximum voltage limiting devices connected across the circuit at spaced points, a voltage source of greater amplitude than and of opposite polarity to the voltage to be measured connected in the circuit between the devices, and a second voltage source of the same amplitude as the first named source and of the same polarity as the voltage to be limited connected in the circuit at the output side of the devices.

9. Voltage limiting means for a circuit comprising a pair of maximum voltage limiting devices connected across the circuit at spaced points, a voltage source of greater amplitude than and of opposite polarity to the voltage to be measured connected in the circuit between the devices, and a second voltage source of the same amplitude as the first named source and of the same polarity as the voltage to be limited connected in the circuit at the output side of the devices, each of said devices including a rectifier and a resistor in series connected across the circuit, and a voltage source of the same polarity as the voltage to be measured connected across the resistor.

10. Voltage limiting means for an alternating current circuit comprising a pair of maximum voltage limiting devices connected across the circuit at spaced points, an alternating current source of greater amplitude than and opposite in phase to the voltage to be limited connected in the circuit between the devices, and a second alternating current source of the same amplitude as and opposite in phase to the first named source connected in the circuit at the output side of the devices.

11. Voltage limiting means for an alternating current circuit comprising a pair of maximum voltage limiting devices connected across the circuit at spaced points, an alternating current source of greater amplitude than and opposite in phase to the voltage to be limited connected in the circuit between the devices, and a second alternating current source of the same amplitude as and opposite in phase to the first named source connected in the circuit at the output side of the devices, each of said devices including a pair of parallel circuits having a rectifier and a resistor in series with the rectifiers in the pair of circuits oppositely connected, and an alternating current source of the same frequency as the voltage to be measured connected across the resistors in a phase relationship such as to oppose flow of current through the pair of circuits.

12. Voltage limiting means for an alternating current circuit comprising a pair of maximum voltage limiting devices connected across the circuit at spaced points, an alternating current source of greater amplitude than and opposite in phase to the voltage to be limited connected in the circuit between the devices, and a second alternating current source of the same amplitude as and opposite in phase to the first named source connected in the circuit at the output side of the devices, each of said devices including a pair of parallel circuits having a rectifier and a resistor in series with the rectifiers in the pair of circuits oppositely connected, an alternating current source of the same frequency as the voltage to be measured connected across the resistors in a phase relationship such as to oppose flow of current through the pair of circuits, and rectifiers between the last named source and the resistors of opposite polarity than the rectifiers in the respective circuits.

CHARLES H. SMOOT.

REFERENCES CITED

The following references are of record in the file of this patent:

UNITED STATES PATENTS

| Number | Name | Date |
|---|---|---|
| 2,098,370 | Bartels | Nov. 9, 1937 |
| 2,285,044 | Morris | June 2, 1942 |